(12) United States Patent
Finnestad et al.

(10) Patent No.: US 7,277,358 B2
(45) Date of Patent: Oct. 2, 2007

(54) APPARATUS, METHOD AND SYSTEM FOR DIGITALLY TRANSMITTING ACOUSTIC PULSE GUN SIGNALS

(76) Inventors: Dean Finnestad, 78 Roberts Crescent, Red Deer, Alberta (CA) T4P 3K7; Scott Finnestad, 72 Parsons Close, Red Deer, Alberta (CA) T4P 2C8

( * ) Notice: Subject to any disclaimer, the term of this patent is extended or adjusted under 35 U.S.C. 154(b) by 310 days.

(21) Appl. No.: 10/893,236

(22) Filed: Jul. 19, 2004

(65) Prior Publication Data

US 2005/0270904 A1    Dec. 8, 2005

(30) Foreign Application Priority Data

Jun. 7, 2004    (CA)    ................................... 2470487

(51) Int. Cl.
*H04H 9/00*    (2006.01)
(52) U.S. Cl. .................... 367/82; 181/106; 181/102; 73/152.58
(58) Field of Classification Search ................ 367/82, 367/95; 181/106, 102; 340/855.6; 375/242; 702/6; 73/152.58
See application file for complete search history.

(56) References Cited

U.S. PATENT DOCUMENTS

| 4,318,298 | A |   | 3/1982  | Godbey et al. |         |
|-----------|---|---|---------|---------------|---------|
| 4,415,895 | A |   | 11/1983 | Flagg         |         |
| 4,793,178 | A |   | 12/1988 | Ahern et al.  |         |
| 5,051,799 | A |   | 9/1991  | Paul et al.   |         |
| 5,200,894 | A |   | 4/1993  | McCoy et al.  |         |
| 5,465,270 | A |   | 11/1995 | Beauducel et al. |      |
| 5,748,471 | A |   | 5/1998  | Grande        |         |
| 5,834,710 | A | * | 11/1998 | Finnestad     | 181/106 |
| 5,852,262 | A |   | 12/1998 | Gill et al.   |         |

FOREIGN PATENT DOCUMENTS

| CA | 1091388 | 12/1980 |
|----|---------|---------|
| CA | 1213030 | 10/1986 |
| CA | 1217850 | 2/1987  |
| CA | 2241545 | 8/1997  |
| CA | 2201215 | 9/1997  |

OTHER PUBLICATIONS

Author Unknown, Various website printouts from the WellSonic LC website (http://www.wellsonic.com/), Jan. 13, 2004, 14pp.

(Continued)

*Primary Examiner*—Albert K. Wong
(74) *Attorney, Agent, or Firm*—Sander R. Gelsing (57) ABSTRACT

The present invention is directed to overcoming analog transmission difficulties by digitizing transducer signals at or near the transducer of an acoustic pulse gun and then transmitting the transducer signals in a digital form so that the signals can be recovered with greater fidelity by a remote computer or recorder. System, apparatus and method aspects of the invention are provided. Advantages of the present invention include better transmission of the acoustic signal from the pulse gun assembly to the computer or recorder, reduced noise and electronic interference, and better data capture.

31 Claims, 14 Drawing Sheets

OTHER PUBLICATIONS

Author Unknown, Various website printouts from the Echometer Company website (http://www.echometer.com/), Jan. 13, 2004, 5pp.

Echometer Company, Gun—Microphone Assemblies for use with Acoustic Liquid Level Instruments, 4 page brochure, publication date unknown.

Echometer Company, Echometer Digital Well Analyzer, 4 page brochure, publication date unknown.

Author Unknown, Various website printouts from the Digital Microphone Online website (http://www.digitalmicrophone.com/), Jan. 9, 2004, 10pp.

* cited by examiner

APPARATUS, METHOD AND SYSTEM FOR DIGITALLY TRANSMITTING ACOUSTIC PULSE GUN SIGNALS

FIELD OF THE INVENTION

The present invention relates generally to the telemetry of signals generated by an acoustic sensor to a remote device and to an apparatus for the implementation thereof. More particularly, the invention relates to digitizing electrical signals produced by an acoustic transducer inside an acoustic pulse gun and subsequently transmitting the digitized signals to a remote receiver or recorder.

BACKGROUND OF THE INVENTION

The level of fluid in the borehole of a well is an important element in the field of oil well testing and operation. Determination of the liquid level in a well by an acoustic pulse has been successfully performed for many years. For example, U.S. Pat. No. 2,232,476 issued to Ritzmann in 1941, discloses the basic methodology wherein a high frequency acoustic pulse, generated by an acoustic pulse gun, is projected down the annulus between the tubing string and the well casing string. Acoustic pulse generating means typically include employing a blank shotgun shell to generate the sonic event, discharging a compressed gas into the annulus to generate the sonic event, or in a wellbore which has a substantial gas pressure it is possible to use the gas pressure itself to create the sonic event. Reflections of the sonic event or acoustic pulse are generated by cross-sectional variations along the length of the tubing string, such as are created by tubing collars or the surface of the liquid column in the annulus. A microphone or acoustic transducer is then used to sense the reflections and provide a signal indicative of those reflections.

The depth to the liquid surface is then determined by counting the number of tubing collars above the liquid interface and multiplying by the average distance between the collars, as indicated by the reflections. Interpretation of the reflection results is typically assisted by passing the electrical output signal of the acoustic transducer of the pulse gun through: 1) a high-pass or band pass filter so as to emphasize the short, high-frequency reflections from tubing collars; and/or 2) a low-pass filter to emphasize the low-frequency pulse from the gas-liquid interface.

Figure 1:
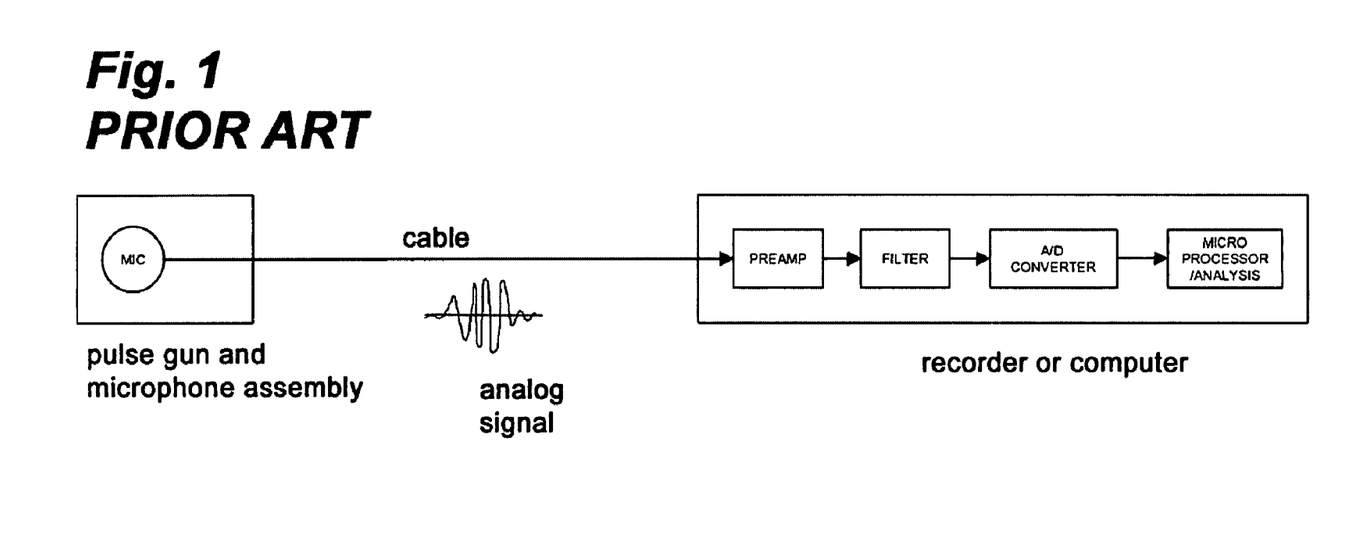
FIG. 1 diagrammatically shows a prior art system for transmitting transducer output signals from a pulse gun assembly to a remote recorder device.

As shown in FIG. 1, modern day pulse gun systems often comprise a pulse gun and microphone assembly connected to a computer or recorder device by means of a lead, cable or similar conductor. Analog signals produced by the microphone or acoustic transducer inside the gun assembly are transmitted along the length of cable and fed to the computer or recording device. Typically the recording device contains electronics to subsequently amplify, filter and then digitize the analog signals received from a cable or conductor. For example, see U.S. Pat. No. 5,117,399 to McCoy et. al where an electronics module contains the electronics to amplify, filter and digitize the analog signals from a microphone cable.

The digitization of the transducer's signal allows for additional analysis of the signal and also for digital storage of the signal. Additionally, various schemes for computer aided interpretation of the reflections are taught by the prior art, see for example U.S. Pat. No. 4,318,298, issued to Godbey, U.S. Pat. No. 4,793,178, issued to Ahern, U.S. Pat. No. 5,200,894, issued to McCoy and Canada Pat. No. 2,201,215 to Grande.

Accordingly, a necessary component of the acoustic pulse gun system is the means for reliably transmitting the signals produced by the transducer inside the pulse gun, which are indicative of the acoustic reflections, to the computer or recording device. However, state-of-the-art cables have relatively poor transmission qualities and the traditional cable system is sensitive to static and electronic noise which may be picked up along the length of a cable. The cable often acts as an antennae picking up electronic noise from a variety of sources. Typical sources of such noise in a well operation environment include electric motors operating nearby, the cathotic protection system installed to protect the metal elements of a well from deteriorating, and cell phones used by personnel. Noise and other extraneous signals can also be produced if the cable is moved during operations; such as due to wind or by an operator accidentally bumping it.

What is desired therefore is a system or method which overcomes the analog transmission difficulties and provides reliable transmission of the signals from a pulse gun assembly to a computer or recorder.

SUMMARY OF THE INVENTION

The present invention is directed to overcoming analog transmission difficulties by digitizing transducer signals at or near the transducer of an acoustic pulse gun and then transmitting the transducer signals in a digital form so that the signals can be recovered with greater fidelity by a remote computer or recorder.

In one aspect the invention provides a system for converting and transmitting analog signals produced by a transducer of a pulse gun assembly to a remote recorder device, the system comprising an analog-to-digital converter located proximate the transducer and digital signal transmission means, wherein the signals produced by the transducer are converted to digital form by the analog-to-digital converter and are transmitted to the remote recorder device by the digital signal transmission means.

In another aspect of the invention there is provided a pulse gun assembly for delivering an acoustic pulse and monitoring resultant reflections from an annulus of a well, the well having a wellhead enabling access to the annulus, comprising a housing having a sidewall forming a chamber and an open end for connecting to the wellhead, an acoustic pulse generating means for creating an acoustic pulse in the chamber, a transducer positioned in the housing and in communication with the chamber for converting said resultant reflections into analog signals, an analog-to-digital converter located proximate the transducer and digital signal transmission means, wherein said analog signals produced by the transducer are converted to digital form by the analog-to-digital converter and are transmitted to a remote recorder device by said digital signal transmission means.

In a third aspect of the invention there is provided a transducer assembly for connection to a pulse gun, comprising a housing, a transducer projecting from the housing and for insertion into the pulse gun assembly, an analog-to-digital converter, positioned inside the housing proximate the transducer, and digital signal transmission means.

In a fourth aspect of the invention there is provided a method for transmitting signals from a transducer inside an acoustic pulse gun assembly to a remote device, said signals indicative of reflections resulting from a high frequency acoustic pulse generated by an acoustic pulse projected down an annulus between a tubing string and a well casing string of a well, the acoustic pulse gun assembly having an analog-to-digital converter proximate the transducer and digital signal transmission means, the method comprising digitizing said signals from said transducer into digital signals using the analog-to-digital converter and transmitting said digital signals to the remote device using the digital signal transmission means.

Advantages of the present invention include better transmission of the acoustic signal from the pulse gun assembly to the computer or recorder, reduced noise and electronic interference, and better data capture.

DETAILED DESCRIPTION OF THE PREFERRED EMBODIMENTS

Reference is to be had to FIGS. 2-9 in which identical reference numbers identify similar components.

Figure 2:
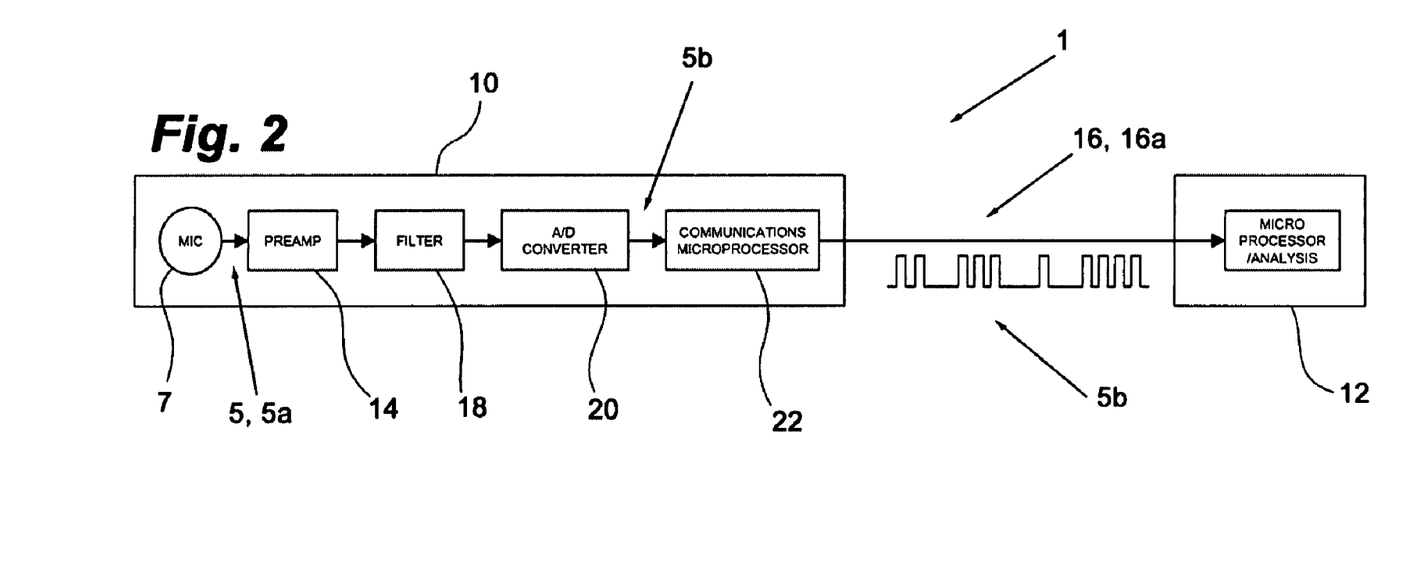
FIG. 2 diagrammatically shows a preferred embodiment of a system for transmitting transducer output signals from a pulse gun assembly to a remote recorder device.
Figure 3A:
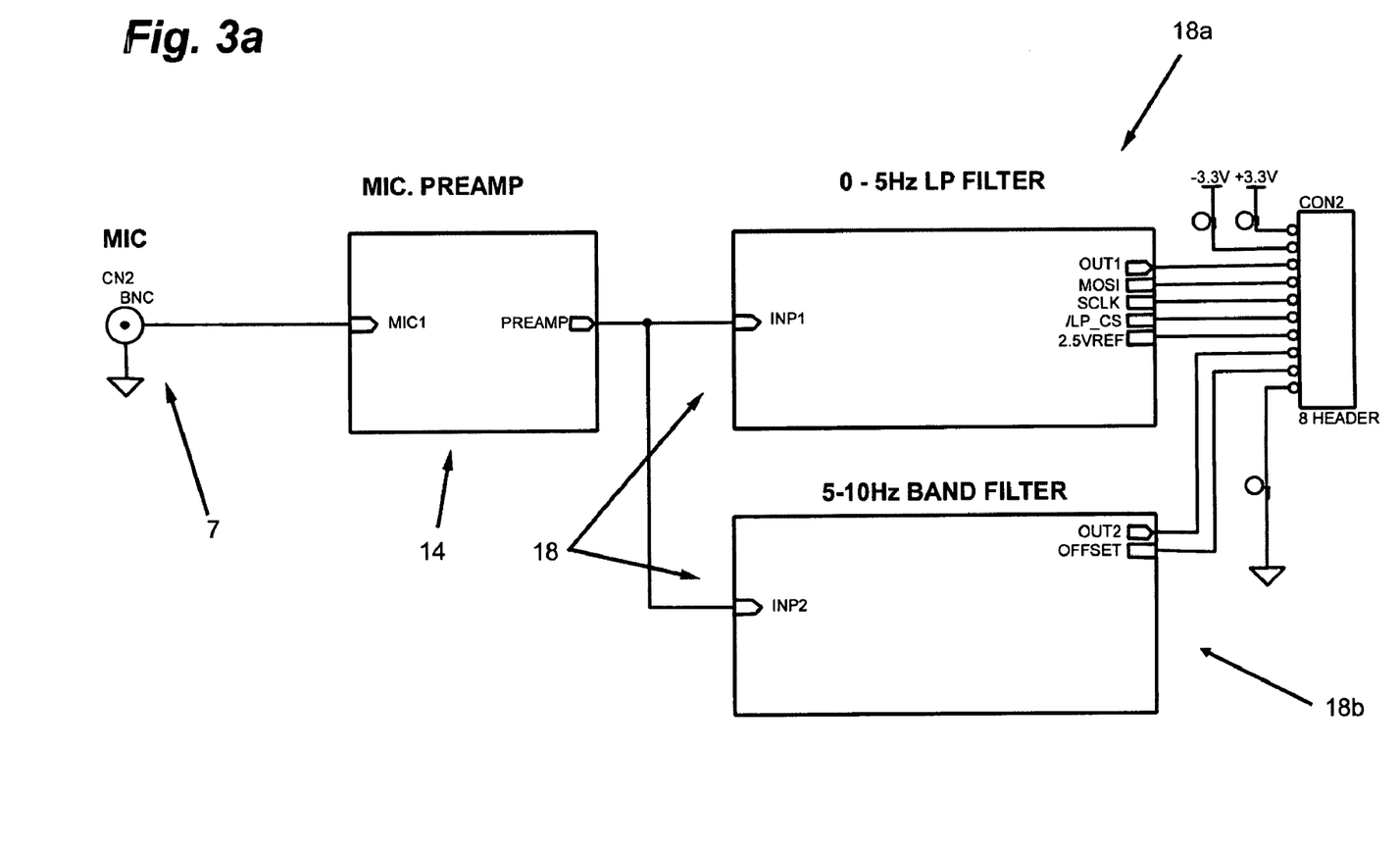
FIGS. 3a and 3b are electrical schematics of the major electronic components of the embodiment of system of FIG. 2.
Figure 3B:
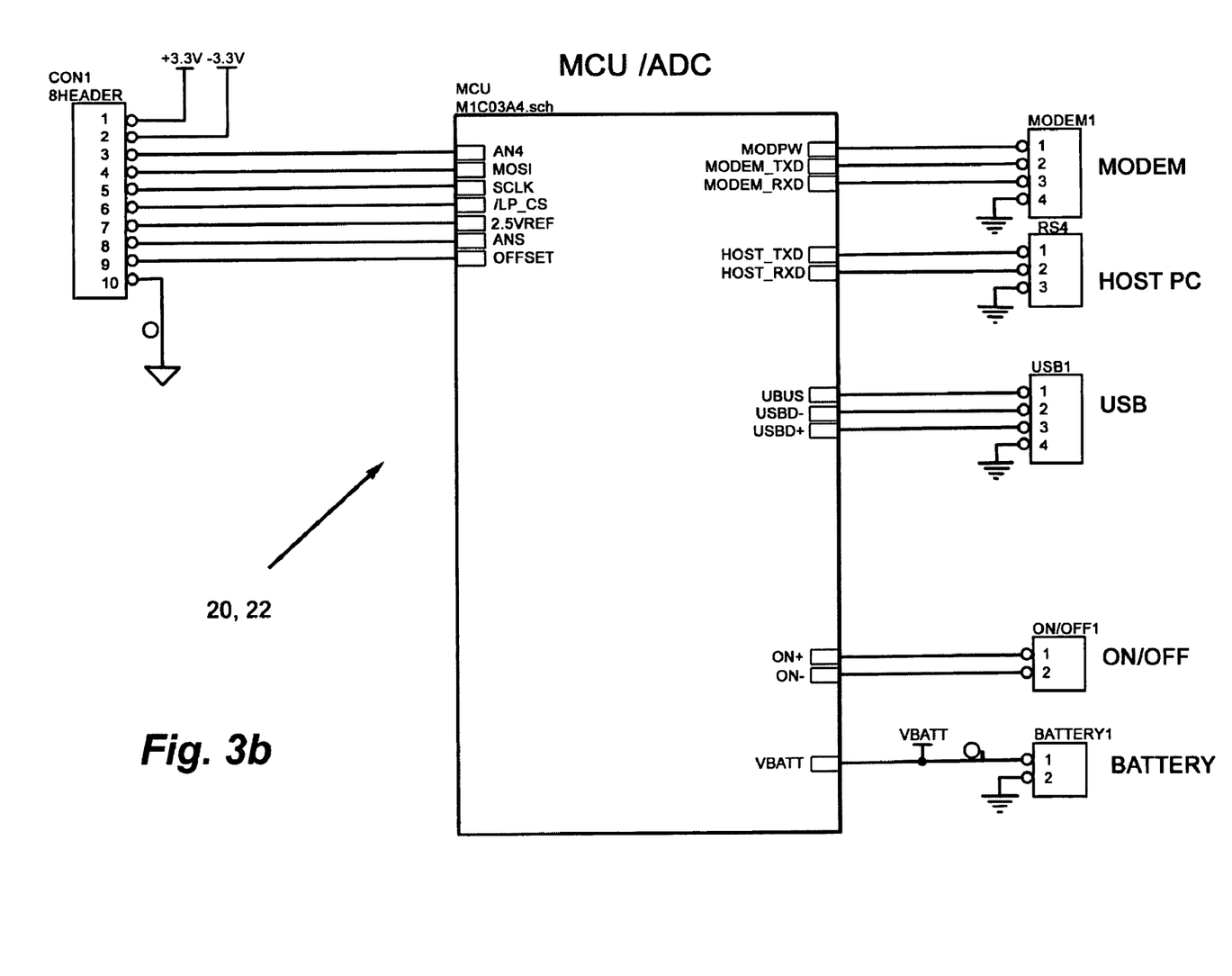
Figure 4:
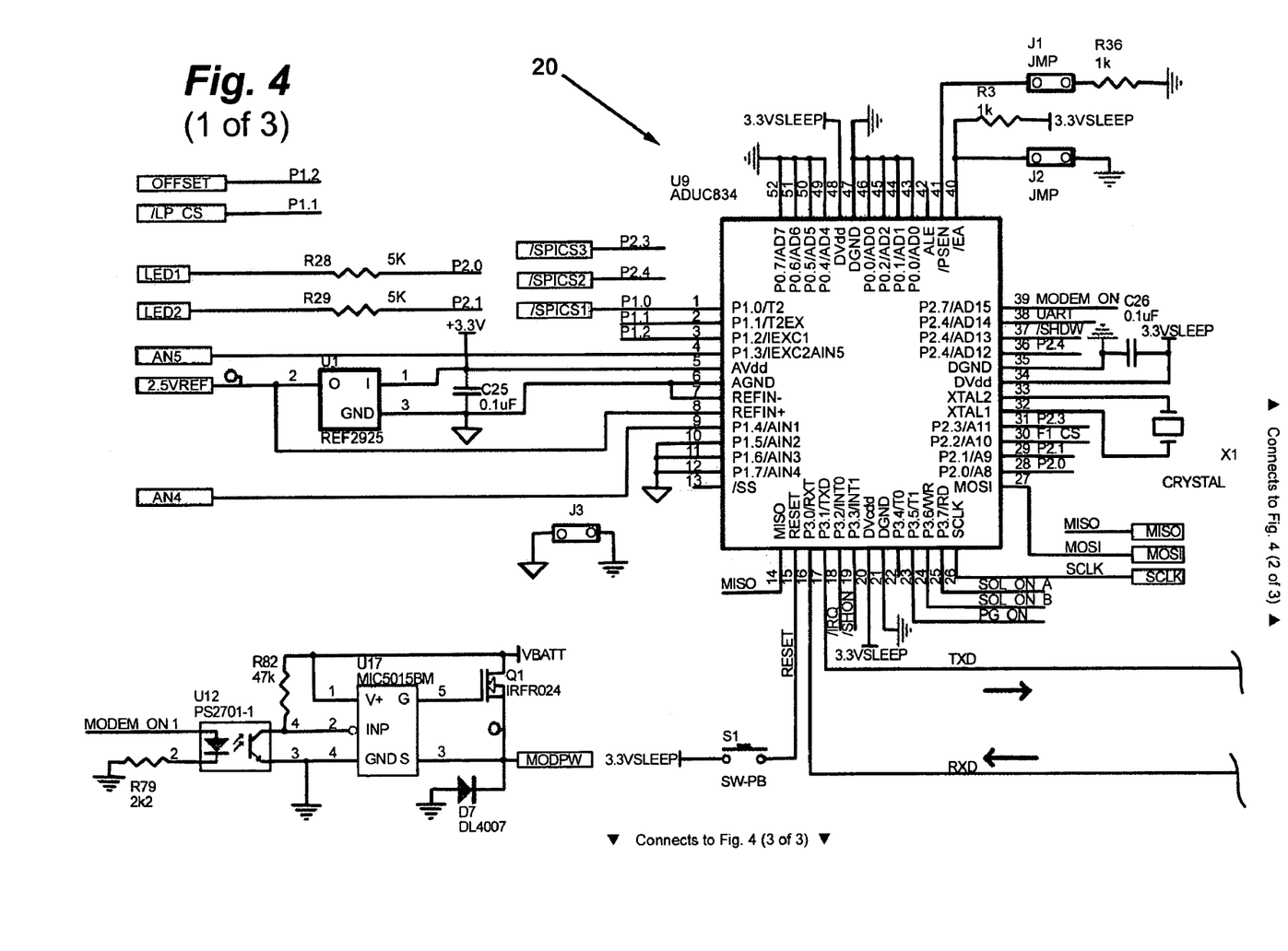
FIG. 4 is an electrical schematic of a preferred embodiment of an analog-to-digital converter and a communications microprocessor.

FIGS. 2-4 show a preferred embodiment of a system 1 for transmitting acoustic pulse gun signals 5 from a pulse gun assembly 10 to a computer or other similar recorder device 12. The system 1 comprises a microphone or acoustic transducer 7 inside the pulse gun 10 assembly, for producing an analog signal 5a indicative of acoustic reflections generated by an acoustic pulse projected down a wellbore, an analog-to digital-converter 20, for converting the analog signal 5a to a digital signal 5b, and digital signal transmission means 16 for transmitting the digital signal 5b to the recording device 12. In this embodiment the digital signal transmission means 16 is a length of cable or conductor 16a. Preferably the analog signal 5a is amplified by a preamplifier 14 and filtered by a filter 18 prior to entering the analog digital converter 20. More preferably, the filter 18 further comprises a 0-5 Hz low pass filter 18a and a 5-10 Hz band pass filter 18b as more clearly shown in FIG. 3a. Even more preferably, the system 1 further comprises communications microprocessor 22 for encoding the digital signal 5b for transmission over the cable 16a via the RS485 serial method in packets using a transmission protocol with error-checking. A suitable transmission protocol with error-checking is the Modbus protocol.

By positioning at least the analog-to-digital converter circuitry 20 physically proximate to the transducer 7, the amount of interference or electronic noise that is picked up by the system of the present invention is drastically minimized when compared to the prior art systems. The analog-to-digital converter 20 may be placed inside the pulse gun assembly 10 proximate to the transducer 7, as in the present embodiment of the system 1.

In this embodiment, the converter 20 is approximately two inches from the transducer 7. However, in other embodiments (not shown), good results have been obtained by positioning the analog-to-digital converter so that it was physically touching the transducer or as far away as nine inches from the transducer. Preferably, the housing of the pulse gun assembly is made from metal so as to provide additional shielding, from outside electronic noise and interference, to the analog components of the electronics inside the pulse gun assembly.

Alternatively, a retro-fit transducer assembly, comprising both a transducer 7 and analog-to-digital converter 20, may be provided to replace analog acoustic transducers in existing art pulse gun assemblies; as is further described below.

By transmitting the signal 5 in digital form 5b over a cable 16a, rather than in analog form, the signal 5 can be recovered with much greater fidelity by the recorder device 12 than was possible with the prior art systems. It will therefore be obvious to those skilled in the art that, although desirable, a preamplifier, a filter and a communications microprocessor are not essential elements to the system 1 of the present invention. For example, the filtering of the signal 5 may be done digitally by circuitry or software of the recorder 12.

Figure 7:
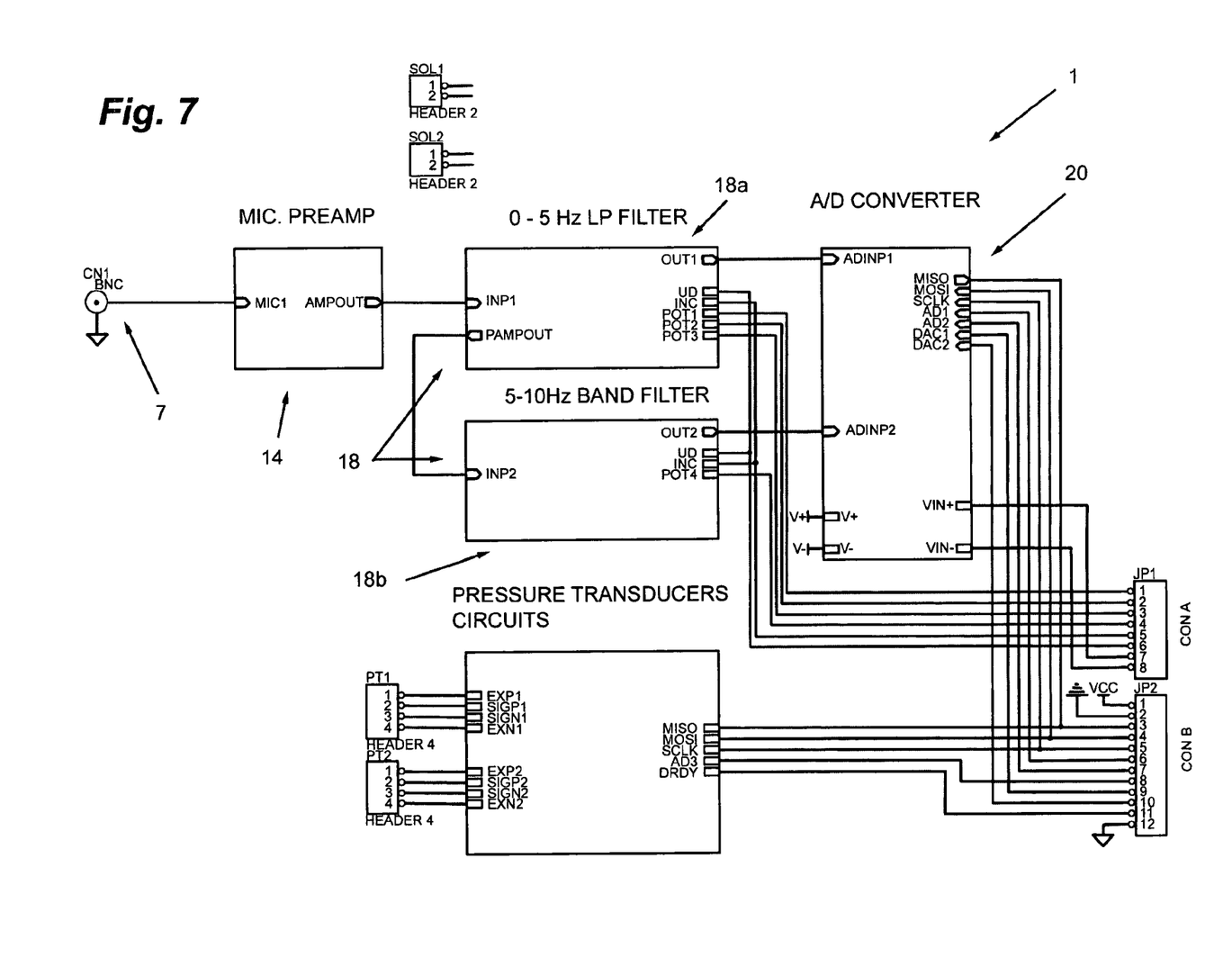
FIG. 7 is an electrical schematic of the major electronic components of another embodiment of the system of the present invention.
Figure 8:
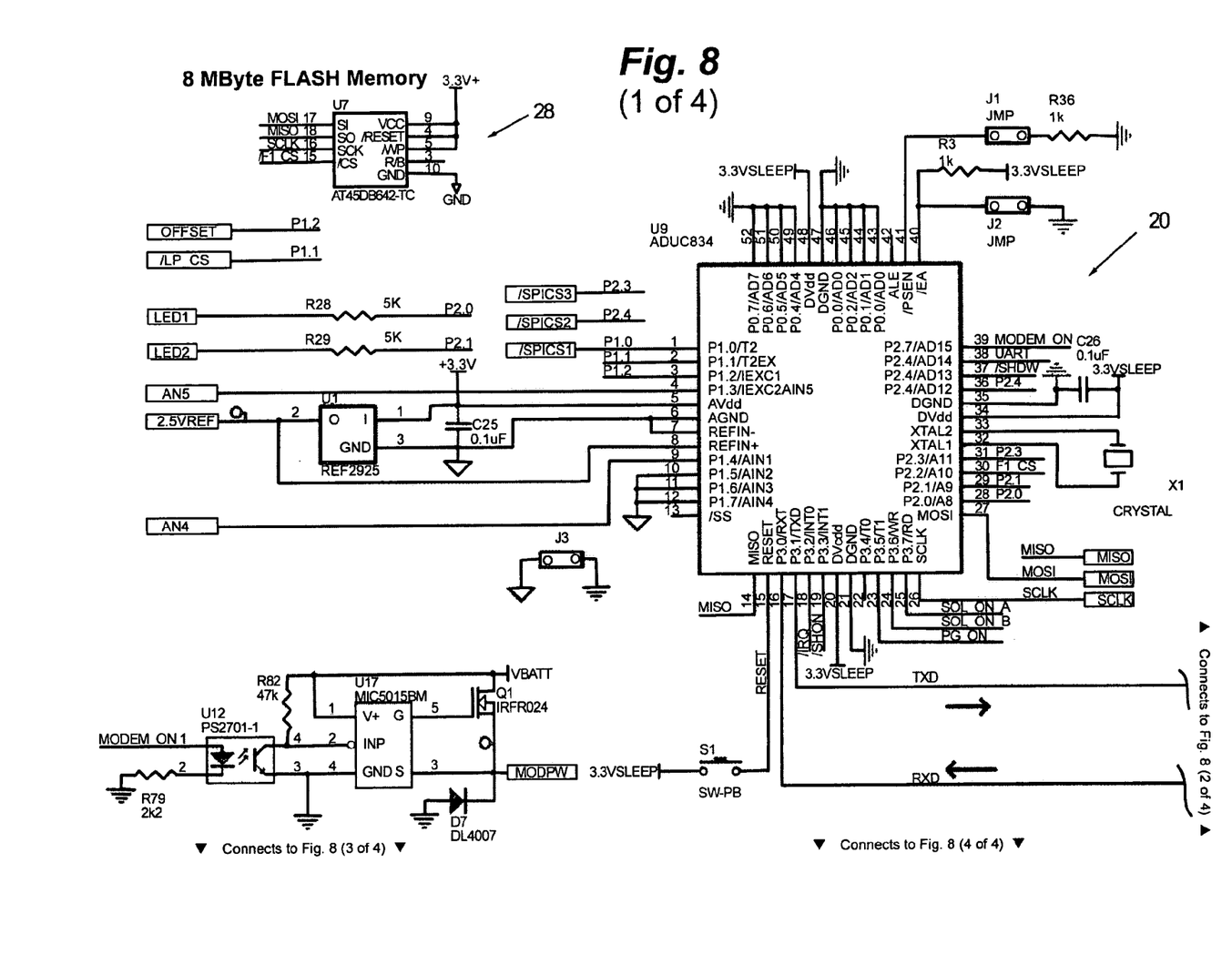
FIG. 8 is an electrical schematic of another embodiment of an analog-to-digital converter and a communications microprocessor.
Figure 9:
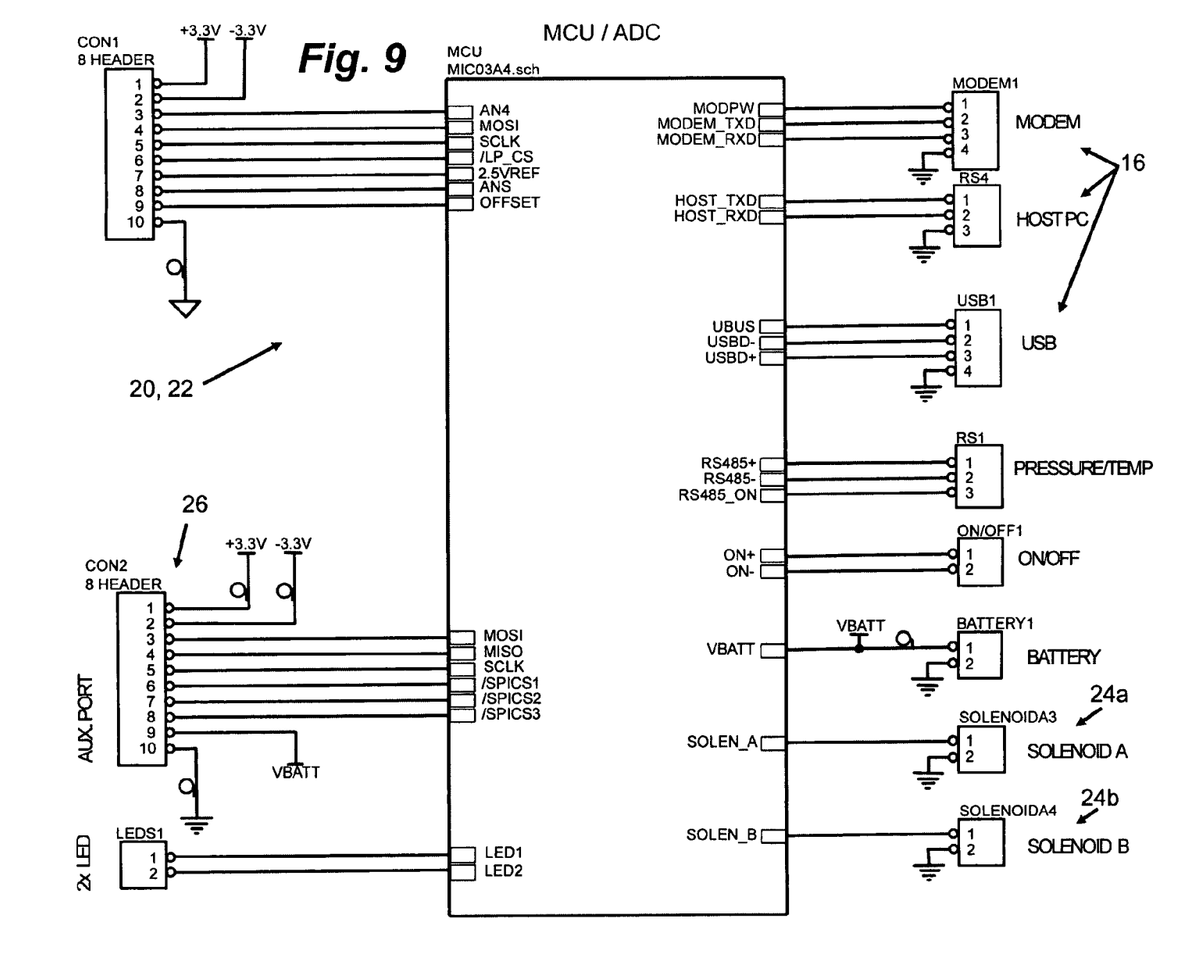
FIG. 9 is an electrical schematic of yet another embodiment of an analog-to-digital converter and a communications microprocessor.

It is to be understood that the foregoing described circuit elements are merely representations of certain embodiments of the present invention. Various other types and values of circuit components may be utilized. For example, FIGS. 7-8 illustrate other embodiments of the system and of the analog-to-digital converter and a communications microprocessor respectively. Advantageously, the embodiment of the FIG. 8 further comprises a memory storage component 28.

Often, in a pulse gun system it is also desirable to energize solenoids (which in turn actuate valves to trigger acoustic pulses) and to transmit data from pressure and temperature sensors or transducers located near the wellbore to the remote recording device 12. Accordingly, and referring now to FIG. 9, yet another embodiment of an analog-to-digital converter 20 and a communications microprocessor 22 is shown. In this embodiment of the converter 20 and microprocessor 22 two solenoids 24a, 24b can be actuated by the microprocessor 22 and the microprocessor 22 can also receive data from pressure sensors (not shown) via auxiliary port 26. The data received by auxiliary port 26 is subsequently transmitted along the same signal transmission means 16 as the digitized signal from the acoustic transducer.

As will be obvious to those skilled in the art, the signal 5, once digitized into a digital signal 5b, can also be transmitted wirelessly to the recorder 12. Therefore, in another embodiment (not shown) the signal transmission means 16 comprises a wireless means, such as that of a wireless network. A suitable protocol for use with the wireless network is the Bluetooth™ protocol.

Figure 5:
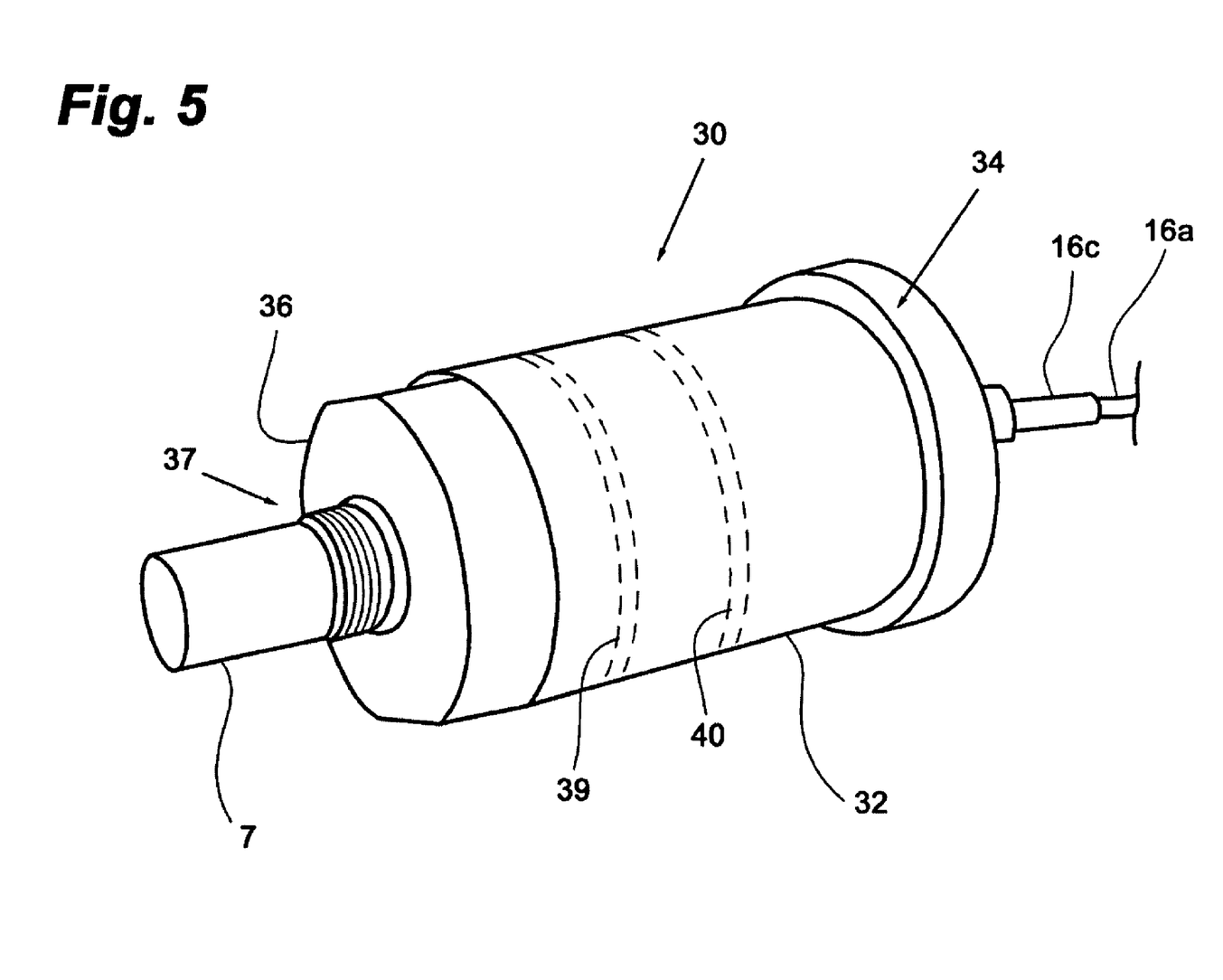
FIG. 5 is perspective view on one embodiment of an apparatus housing the electronic components of the present invention and suitable for connection to a pulse gun.
Figure 6:
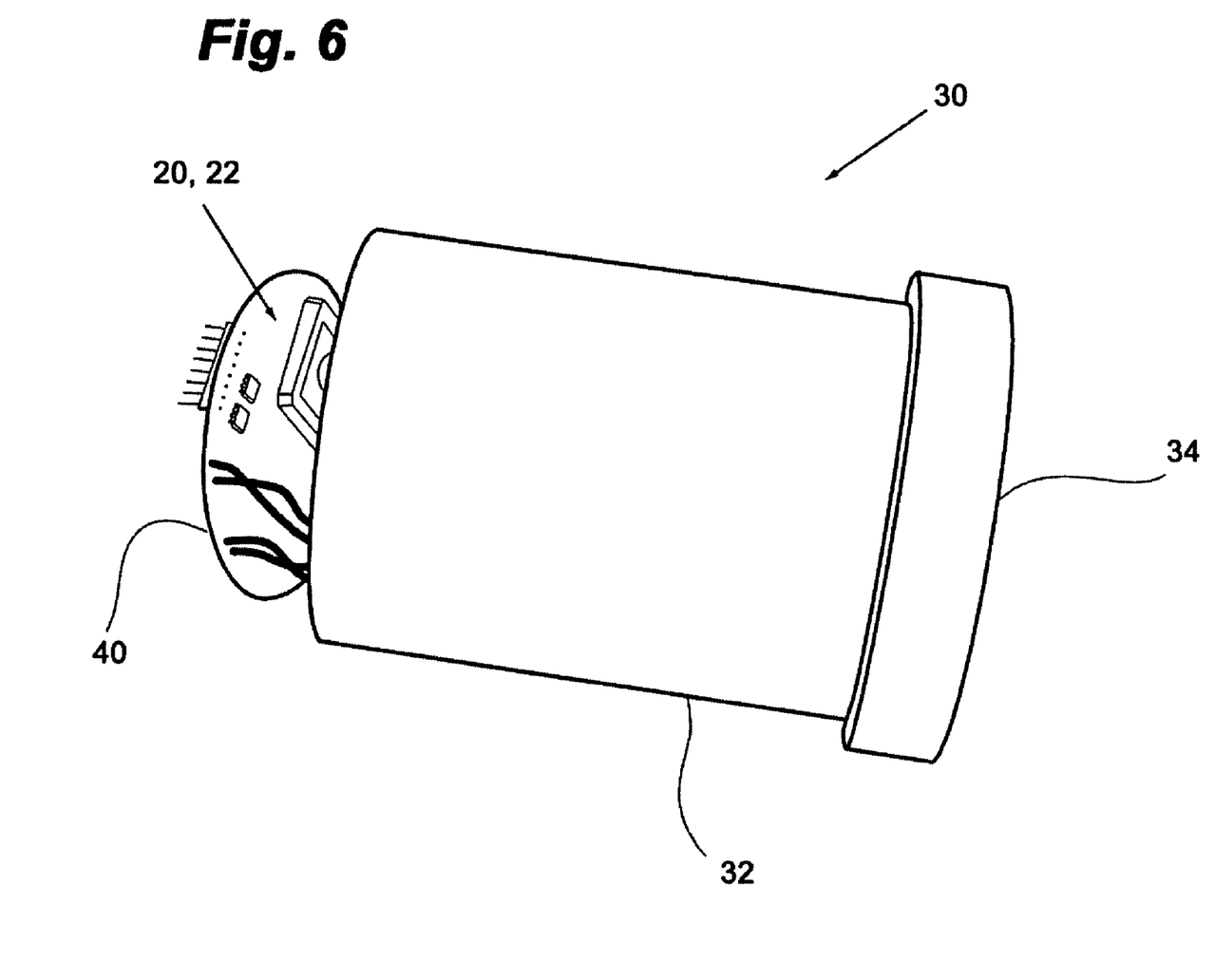
FIG. 6 is a partial exploded perspective view of the apparatus of FIG. 5.

Now referring to FIGS. 5 and 6, one embodiment of a transducer assembly 30, suitable for housing the analog-to-digital converter circuitry 20 physically proximate a transducer 7 and for connecting to a pulse gun, is shown. The transducer assembly 30 comprises a metal cylindrical housing 32 of approximately three inch diameter and eight inches in length, a circular metal end cap 34, a circular metal end plate 36 with externally threaded section 37, a first circular circuit board 39 with the preamplifier (not shown) and filter (not shown) and a second circular circuit board 40 with the digital-to-analog converter 20 and the communications microprocessor 22. Preferably the end plate 36 is ¾" thick stainless steel and able to withstand pressures of up to 3000 psi, so as to isolate the circuit boards 39, 40 inside the housing 32 from the pressures that may be present in the pulse gun. More preferably, the housing 32 of the transducer assembly 30 is made from metal so as to provide additional shielding from outside noise and interference to the analog components of the electronics inside assembly 30.

The transducer assembly 30 further comprises cable connecting means 16*c* on end cap 34, for connecting the transducer assembly 30 to a cable 16*a*; and thus the cable connect means 16*c* and cable 16*a* are yet another embodiment of the digital signal transmission means 16. Advantageously, the end cap 34 protects the circuit boards 39, 40 from the weather and elements to which the assembly 30 may be exposed.

In this embodiment, the transducer 7 is mounted on end plate 36 and projects axially from the transducer assembly 30 as shown in FIG. 8. Advantageously, the transducer 7 can be inserted into a pulse gun (not shown) and, by threading the threaded section 37 of the microphone assembly 30 into a matching threaded section on the pulse gun, the transducer assembly 30 is held in place. More advantageously, the transducer assembly 30 may be retrofit onto existing pulse guns, by removing the existing transducer from the pulse gun, ensuring that the treaded section 37 matches the treaded section of the removed transducer, inserting transducer 7 of assembly 30 into the pulse gun and treading the transducer assembly 30 into place.

The first circular board 39 and the second circular board 40 are positioned inside the cylindrical housing 32, the outside diameter of the circular boards being slightly smaller than the inside diameter of the housing 32. Connectors or wires (not show) operationally connect the transducer 7 to the first circuit board 39, the first circuit board 39 to the second circuit board 40, and the second circuit board 40 to the cable connecting means 16*c*. The end cap 34 and end plate 36 connect to either end of the housing 32 (as shown), sealing the boards 39, 40 and other electronic components inside and protecting them from the elements. Since the transducer 7 projects axially from end cover 36, it can be inserted into a pulse gun.

It is to be understood that the foregoing described transducer assembly components are merely representations of certain embodiments of the present invention. Various other types and dimensions of transducer assembly components may be utilized. For example, the housing could be a square box, rather than a cylinder and the two circular circuit boards could be combined into one square circuit board.

The embodiments of the invention in which an exclusive property or privilege is being claimed are defined as follows:

1. A system for converting and transmitting analog signals produced by an acoustic transducer of a pulse gun assembly to a remote recorder device, the system comprising:
    an analog-to-digital converter located inside the pulse gun assembly;
    means to isolate the analog-to-digital converter from wellbore pressures that may be present in the pulse gun assembly; and
    digital signal transmission means;
    wherein said signals produced by the transducer are converted to digital form by the analog-to-digital converter and are transmitted to the remote recorder device by the digital signal transmission means.

2. The system of claim 1 wherein the digital signal transmission means are wireless.

3. The system of claim 1 wherein the means to isolate the analog-to-digital converter from wellbore pressures further comprises:
    a transducer assembly suitable for housing the analog-to-digital converter;
    wherein the acoustic transducer projects from the transducer assembly into the pulse gun assembly and wherein the analog-to-digital converter is positioned inside said transducer assembly.

4. The system of claim 3 wherein the transducer assembly further comprises:
    a housing;
    an end cap; and
    an end plate.

5. The system of claim 4 wherein the end plate is capable of withstanding wellbore pressures of up to 3000 psi.

6. The system of claim 4 wherein the housing, end cap and end plate are all of metal.

7. The system of claim 4 wherein the transducer is mounted on transducer assembly's end plate and projects axially therefrom.

8. The system of claim 1 further comprising a memory storage component located inside the pulse gun assembly.

9. The system of claim 1 further comprising a communications microprocessor.

10. The system of claim 9 further comprising at least one solenoid which can be actuated by the communications microprocessor.

11. The system of claim 9 wherein the communications microprocessor is further capable of receiving data from at least one pressure sensor via an auxiliary port.

12. A transducer assembly for connection to a pulse gun, comprising:
    a housing suitable for containing an analog-to-digital converter;
    an external transducer, for measuring an acoustic signal, mounted and projecting from the housing and for insertion into the pulse gun;
    an analog-to-digital converter, positioned inside the housing proximate the transducer, wherein the housing isolates the analog-to-digital converter from the environment inside the pulse gun; and
    digital signal transmission means.

13. The assembly of claim 12 further comprising a communications microprocessor.

14. The transducer assembly of claim 12 further comprising:
    a housing;
    an end cap; and
    an end plate.

15. The transducer assembly of claim 14 wherein the end plate is capable of withstanding wellbore pressures of up to 3000 psi.

16. The transducer assembly of claim 14 wherein the housing, end cap and end plate are all of metal.

17. The transducer assembly of claim 14 wherein the transducer is mounted on transducer assembly's end plate and projects axially therefrom.

18. The assembly of claim 12 wherein the digital signal transmission means comprises are wireless.

19. A method for transmitting signals from a transducer inside an acoustic pulse gun assembly to a remote device, said signals indicative of reflections resulting from a high frequency acoustic pulse generated by an acoustic pulse projected down an annulus between a tubing string and a well easing string of a well, the acoustic pulse gun assembly having an analog-to-digital converter proximate the transducer and digital signal transmission means, the method comprising:

placing the analog-to-digital converter inside the pulse gun assembly;

isolating the analog-to-digital converter from wellbore pressures that may be present in the pulse gun assembly;

digitizing said signals from said transducer into digital signals using the analog-to-digital converter; and     transmitting said digital signals to the remote device using the digital signal transmission means.

20. The method of claim 19 wherein the isolating step further comprising the steps of:

providing a housing suitable for containing the analog-to-digital converter;

placing the analog-to-digital converter inside said housing; and     projecting the transducer from said housing.

21. A pulse gun assembly for delivering an acoustic pulse and monitoring resultant reflections from an annulus of a well, the well having a wellhead enabling access to the annulus, comprising:

a transducer positioned in the pulse gun assembly and in communication with the annulus of the well for converting said resultant reflections into analog signals;

an analog-to-digital converter positioned inside the pulse gun assembly;

means to isolate the analog-to-digital converter from wellbore pressures that may be present in the pulse gun assembly; and     digital signal transmission means;

wherein said analog signals produced by the transducer are converted to digital form by the analog-to-digital converter and are transmitted to a remote recorder device by said digital signal transmission means.

22. The assembly of claim 21 wherein the digital signal transmission means are wireless.

23. The pulse gun assembly of claim 21 wherein the means to isolate the analog-to-digital converter from wellbore pressures further comprises:

a transducer assembly suitable for housing the analog-to-digital converter;

wherein the acoustic transducer projects from the transducer assembly into the pulse gun assembly and wherein the analog-to-digital converter is positioned inside said transducer assembly.

24. The pulse gun assembly of claim 23 wherein the transducer assembly further comprises:

a housing;

an end cap; and an end plate.

25. The pulse gun assembly of claim 24 wherein the end plate is capable of withstanding wellbore pressures of up to 3000 psi.

26. The pulse gun assembly of claim 24 wherein the housing, end cap and end plate are all of metal.

27. The pulse gun assembly of claim 24 wherein the transducer is mounted on transducer assembly's end plate and projects axially therefrom.

28. The pulse gun assembly of claim 21 further comprising a memory storage component.

29. The assembly of claim 21 further comprising a communications microprocessor.

30. The pulse gun assembly of claim 29 further comprising at least one solenoid which can be actuated by the communications microprocessor.

31. The pulse gun assembly of claim 29 wherein the communications microprocessor is further capable of receiving data from at least one pressure sensor via an auxiliary port.

\* \* \* \* \*